May 4, 1943.  T. A. PETERMAN  2,318,257
RESILIENT WHEEL MOUNTING
Filed May 3, 1941　　7 Sheets-Sheet 1
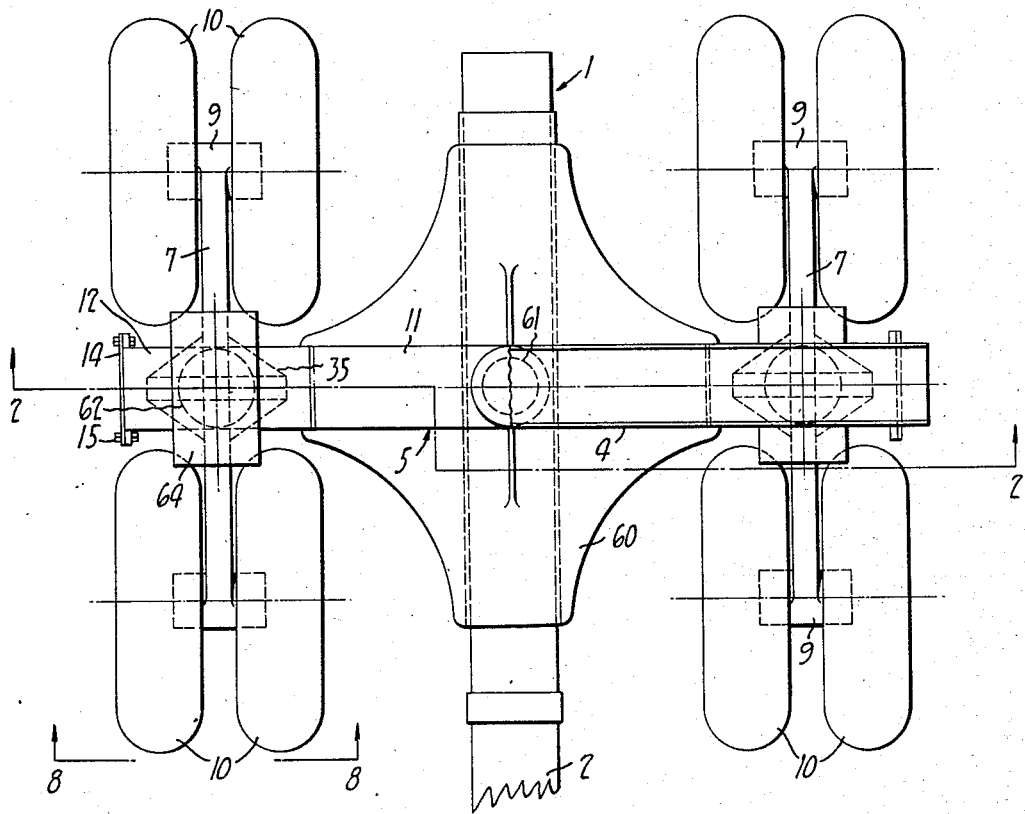
FIG_1_
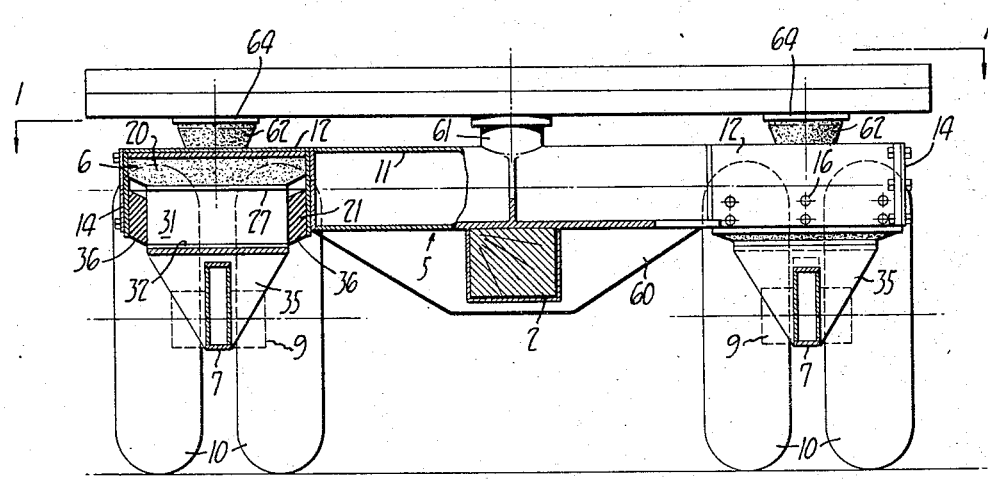
FIG_2_
INVENTOR
Theodore A. Peterman
BY
ATTORNEYS

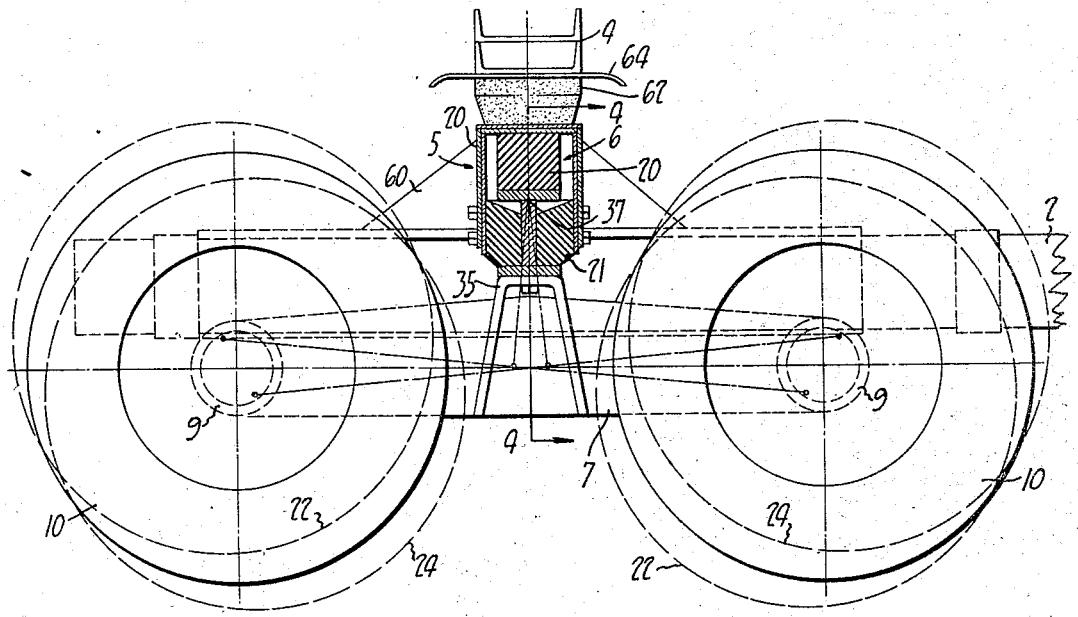
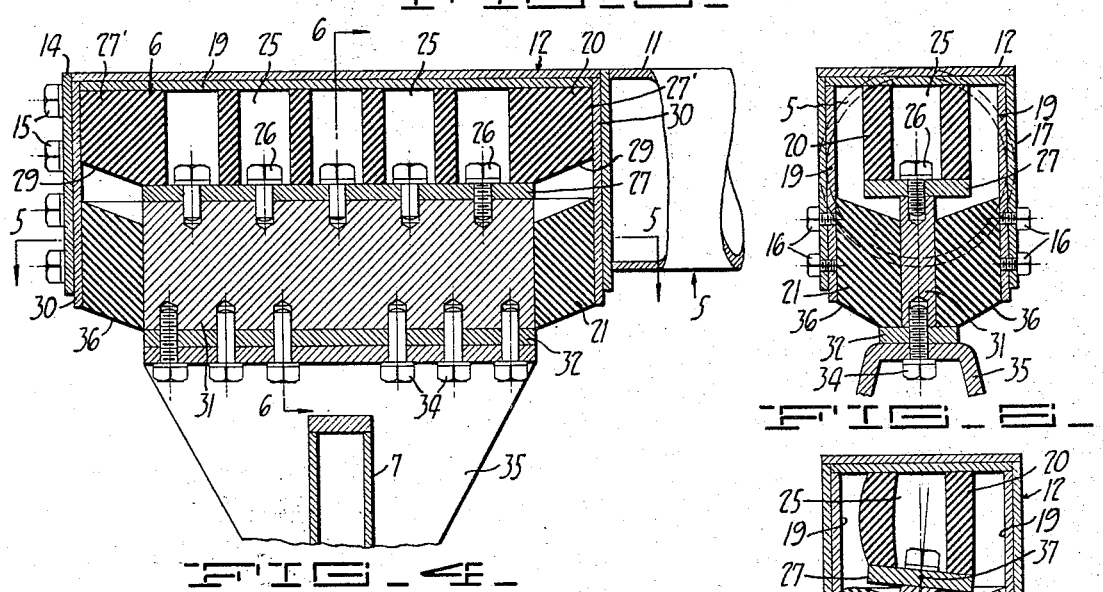

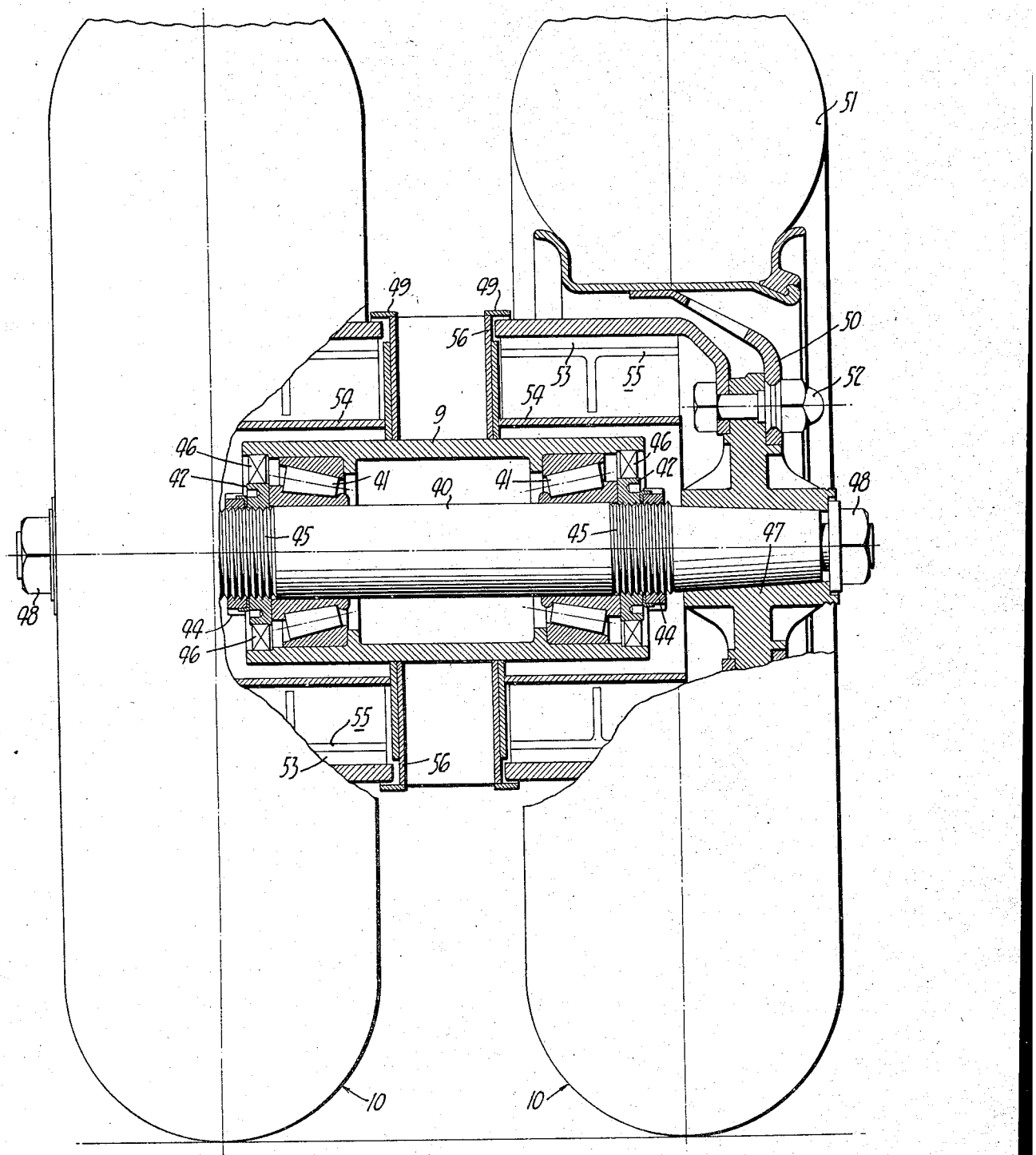

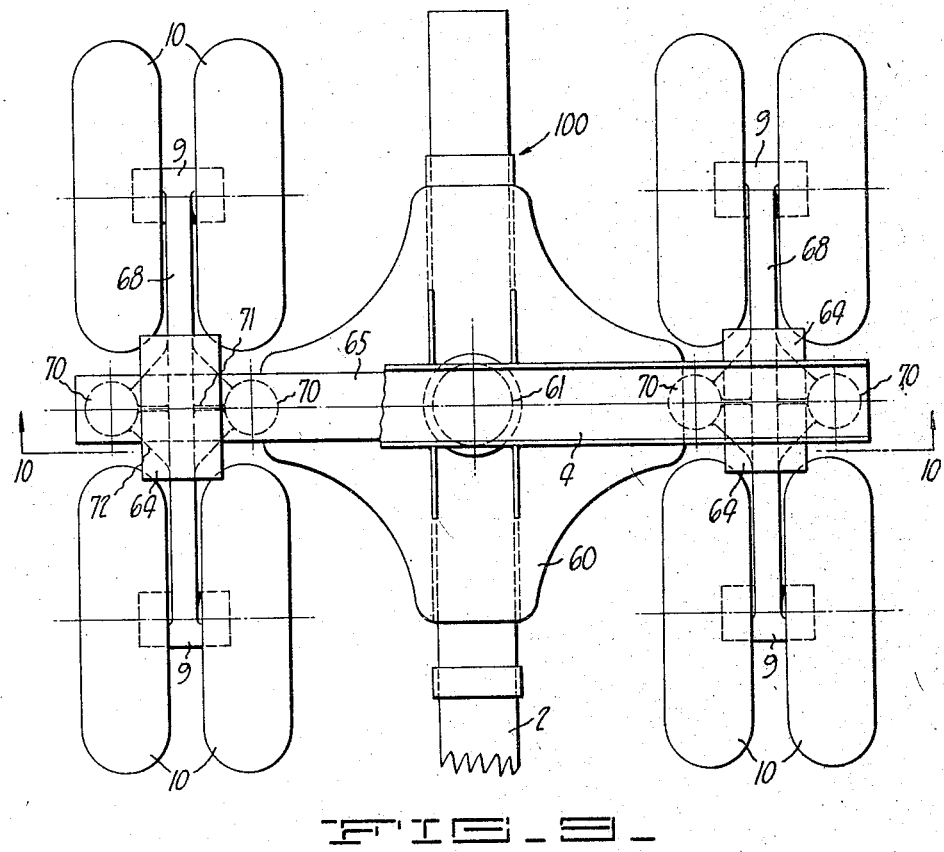
FIG_9_
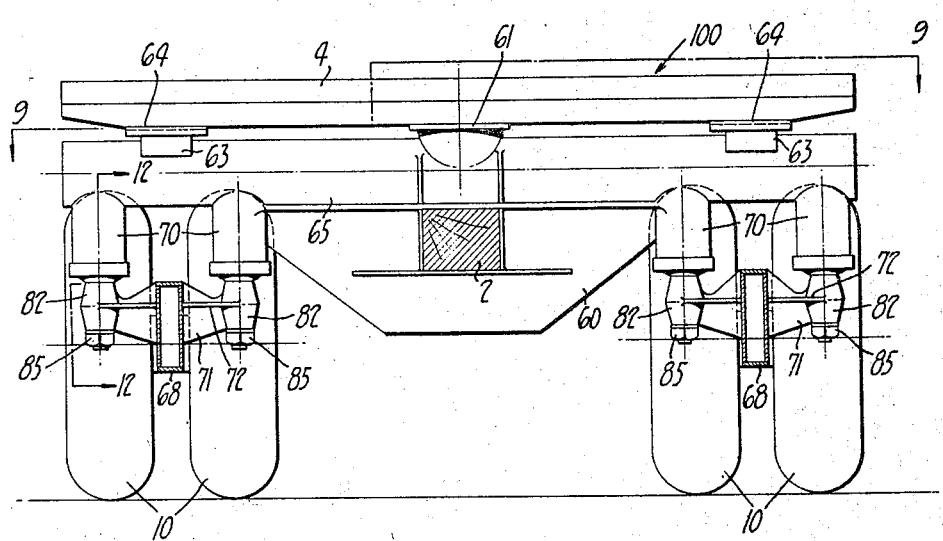
FIG_10_

May 4, 1943. T. A. PETERMAN 2,318,257
RESILIENT WHEEL MOUNTING
Filed May 3, 1941 7 Sheets-Sheet 5
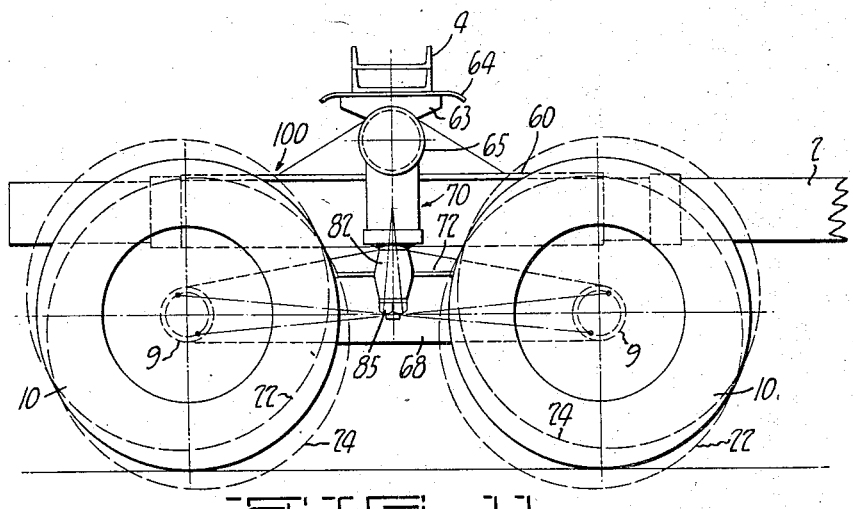
FIG_11_
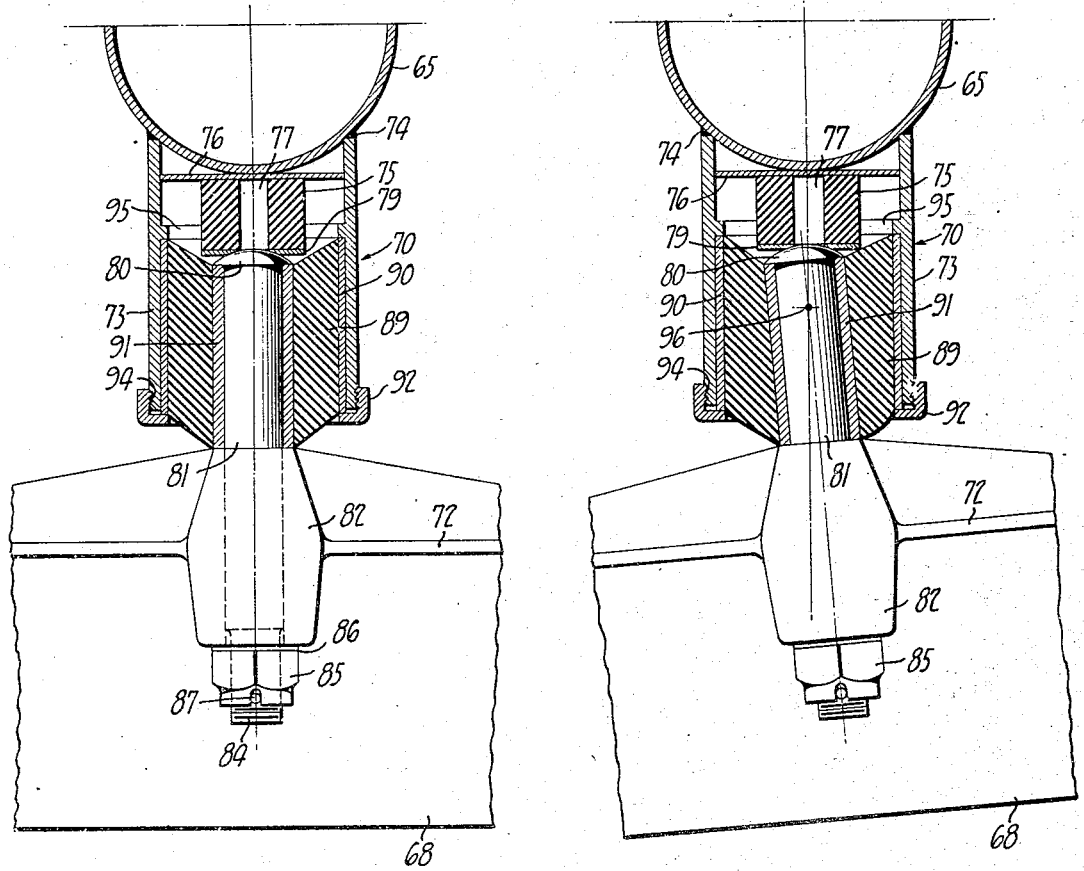
FIG_12_   FIG_13_
INVENTOR
Theodore A. Peterman
BY 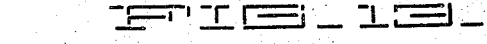
ATTORNEYS May 4, 1943. T. A. PETERMAN 2,318,257
RESILIENT WHEEL MOUNTING
Filed May 3, 1941 7 Sheets-Sheet 6
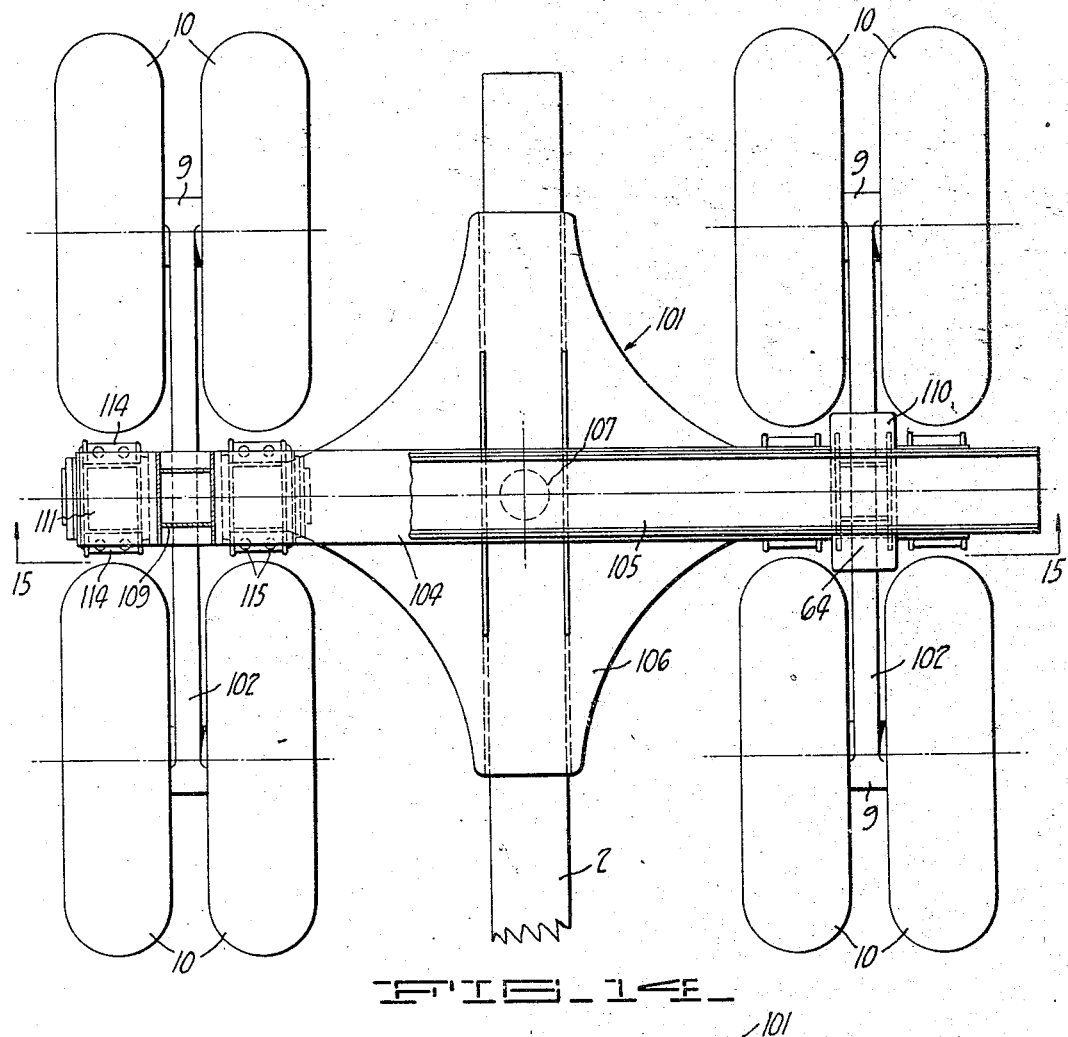
FIG_14_
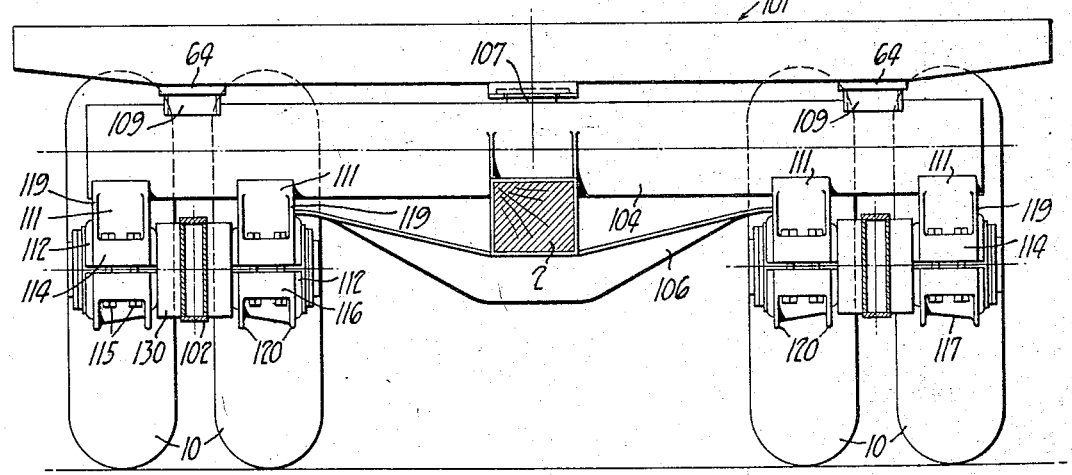
FIG_15_
INVENTOR
Theodore A. Peterman
BY
ATTORNEYS

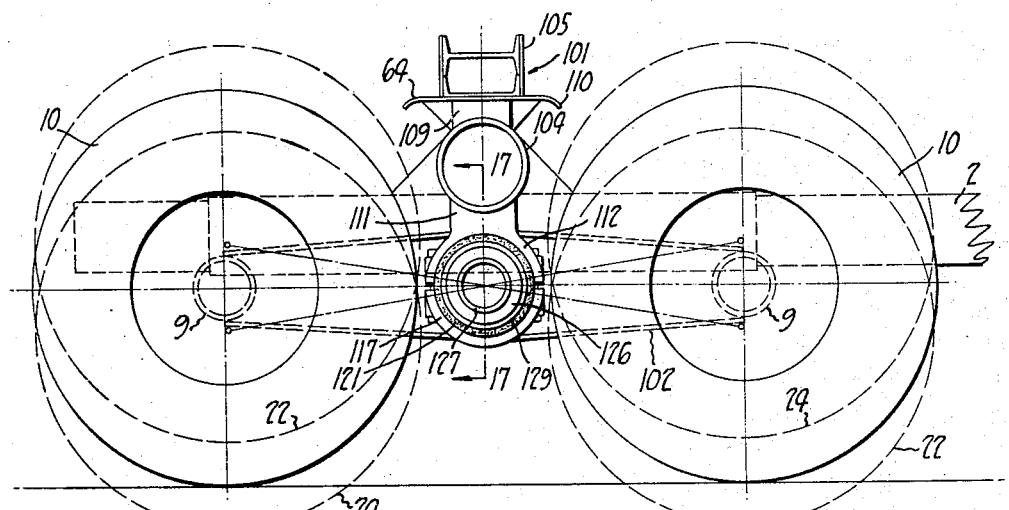
FIG_16_
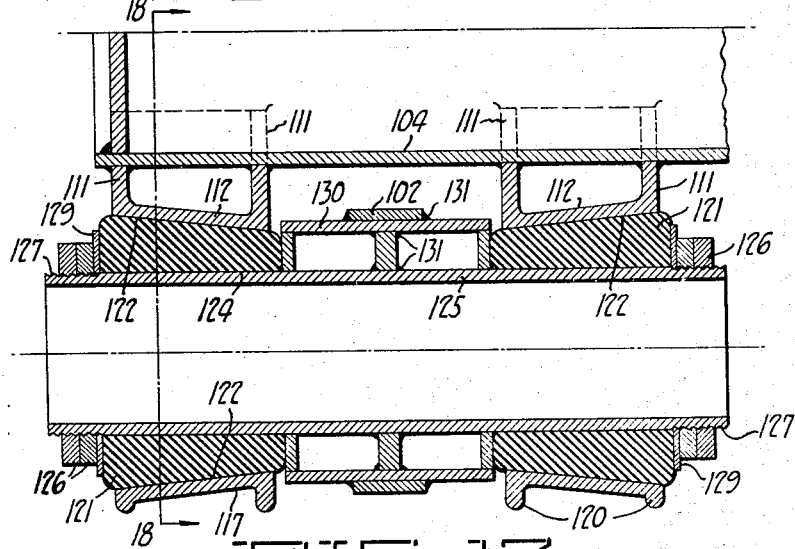
FIG_17_
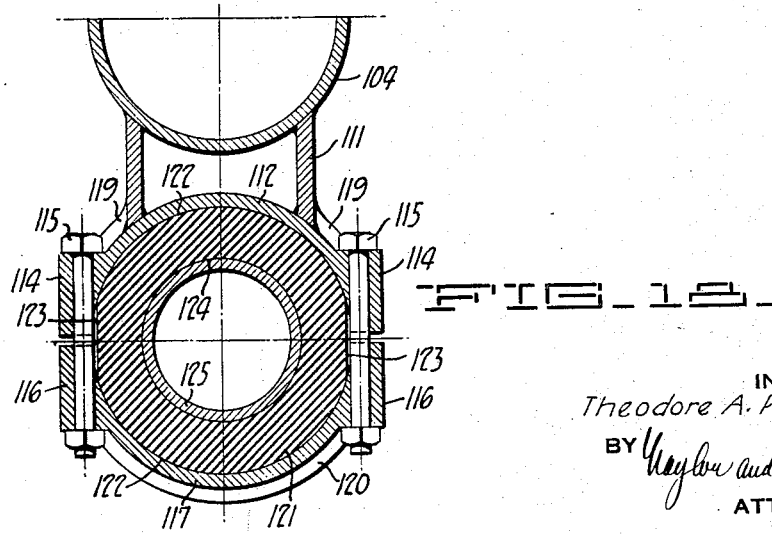
FIG_18_
INVENTOR
Theodore A. Peterman
BY
ATTORNEYS Patented May 4, 1943

2,318,257

UNITED STATES PATENT OFFICE 2,318,257

RESILIENT WHEEL MOUNTING

Theodore A. Peterman, Tacoma, Wash.

Application May 3, 1941, Serial No. 391,668

8 Claims. (Cl. 280—124)

My invention relates to suspension systems, and particularly to resilient mountings for multiple-wheel truck and trailer units.

The transportation of heavy loads over rough terrains presents problems not encountered to a similar degree in hauling on smooth highways. An example of such service is found in the logging industry, where huge logs must be carried out of the forests over trails and unimproved roads to the saw mills. The dictates of economy require that such loads must be carried at substantial velocities, and the suspension systems used must be suitable for high speed hauling on paved roads wherever they are available.

The latter requirement practically eliminates track-laying vehicles from consideration, and makes it desirable to use a plurality of wheels to distribute the weight of the load over a larger area of the road surface. Each wheel unit must be resiliently connected to the load carrying frame independently of the other wheel units for smooth hauling. Such independent suspensions utilizing conventional steel springs and multiple bearings have been unsatisfactory in service. The springs required are cumbersome, making the unsprung weight ratio unfavorable. Lubrication and maintenance of bearings have been expensive and timeconsuming, and the initial expense excessive.

The present invention makes use of rubber mountings in certain preferred forms which will be set forth hereafter. The arrangements shown provide a compact, light, and convenient individual suspension for each wheel unit. The problem of lubrication is eliminated, maintenance is reduced to a minimum, and the entire suspension unit may be quickly replaced when desired.

In my embodiments, as set forth below, the unsprung weight is greatly reduced, which is of acknowledged advantage in reducing wear and tear on the highways, while the truck operator benefits by considerable savings in the first cost as well as in upkeep.

These and other advantages will appear to those skilled in the art from the following description, and from the drawings, in which I have illustrated the preferred embodiment of my invention.

In the drawings:

Figure 1 is a top view of an eight-wheel supporting unit embodying a preferred form of my invention, taken in the plane of line 1—1 in Figure 2;

Figure 2 is a plan view of the embodiment shown in Figure 1, taken as indicated by the section line 2—2 of that figure, and partially in section;

Figure 3 is a side view, partially in section, of the embodiment of Figure 1;

Figure 4 is a sectional view, taken as indicated by arrows 4—4 of Figure 3, showing in detail the structure of one of my resilient suspension units;

Figure 5 is a top sectional view of the suspension unit of Figure 4, taken as indicated by line 5—5 of that figure;

Figure 6 is an end sectional view of the suspension unit of Figure 4, taken as indicated by line 6—6 of that figure;

Figure 7 is a sectional view corresponding to that of Figure 6, but with the suspension unit illustrated in a flexed position corresponding to that assumed when the wheels occupy the dotted-line positions illustrated in Figure 3;

Figure 8 is a view, partially in section, taken in the direction indicated by arrows 8—8 of Figure 1, showing the connection between the walking beam and each wheel pair;

Figure 9 is a top view of an eight-wheel supporting unit embodying another preferred form of my invention, taken in plane 9—9 of Figure 10;

Figure 10 is a plan view of the embodiment shown in Figure 9, taken as indicated by the arrows 10—10 of that figure;

Figure 11 is a side view of the embodiment of Figure 9;

Figure 12 is a side view, partially in section, taken as indicated by line 12—12 of Figure 10 to show in detail the construction of the resilient suspension unit embodied therein;

Figure 13 is a view corresponding to that of Figure 12, but illustrating the suspension unit in a flexed position corresponding to that occupied when the wheels assume a tilted position such as that indicated by the dotted outline in Figure 11;

Figure 14 is a top view of an eight-wheel supporting unit embodying still another preferred form of my invention;

Figure 15 is a vertical section of the embodiment shown in Figure 14, taken as indicated by the arrows 15—15 of that figure;

Figure 16 is a side view of the embodiment of Figure 14;

Figure 17 is a sectional view, taken as indicated by line 17—17 of Figure 16, showing in detail the construction of the resilient suspension unit incorporated in Figure 14; and Figure 18 is a side sectional view, taken as indicated by line 18—18 of Figure 17, of the suspension unit detail.

Directing attention now to Figures 1 and 2 of the drawings, I have shown an eight-wheel trailer unit, generally denominated as 1, which is joined to a suitable motor-driven unit, not shown, by a connecting member 2. The load is carried directly on a bunk 4 supported on a bolster 5. Bolster 5 extends transversely from the connecting member 2, and has at each end thereof resilient mounting units 6 to which are attached equalizer or walking beams 7 extending parallel to the connecting member 2. At each end of each walking beam 7 is formed a hub 9 to which a pair of wheels 10 is connected. The details of the mounting in hub 9 is shown in Figure 8, and will be described hereafter.

The bolster 5 may conveniently be formed with a tubular central section 11, to either end of which is secured a rectangular socket 12 in which the resilient mounting unit 6, hereinafter called simply the cushion 6, is held. Socket 12 is open on the bottom, and at the outer end is closed by a removable end plate 14 held in position by suitable means such as bolts 15. The cushion unit 6 is secured in socket 12 by a plurality of bolts 16 threadably inserted through side walls 17 of the socket 12 and into steel casing 19 of the cushion 6.

The details of the cushion unit 6 and the manner in which it rockably attaches the walking beam 7 to the bolster 11 will next be considered. This rockable connection permits the front and rear pairs of wheels 10 to accommodate themselves in turn to inequalities in the road surface, producing a vertical displacement of the bolster 5 which is only half that which would be experienced if a single set of wheels were used on each side or if beam 9 were not permitted to rock.

Each of the cushion units 6 comprises a rectangular steel casing 19 open at the bottom, and of proper size to fit snugly within socket 12. Within the casing 19, and bonded thereto by means well known in the art, is a compression block 20 of rubber, which carries the vertical load, and a torsion block 21, likewise of rubber, which carries the horizontal stresses and provides for rocking of beam 7.

A comparison of Figures 6 and 7 will indicate the manner in which the torsion block 21 deforms from the normal when stress is applied to tilt the pairs of wheels attached to walking beam 7 out of alignment parallel to the line of travel of the trailer unit 1, as for example when the wheels are rocked into one of the dotted line wheel positions 22 or 24 (Figure 3) by inequalities in the road surface.

The compression block 20 is substantially rectangular in outline, and is pierced vertically by a plurality of apertures 25 aligned in a single row centrally of the block. The purpose of these apertures 25 is dual; to provide space for the deformation of the rubber under load, and to permit the insertion of a plurality of bolts 26 through a rectangular steel load plate 27 bonded to the underside of the block 20. The load plate 27 extends across the full width of the block, but is shorter than the casing 19, so that end portions 27' overhang the plate 27. The under surface 29 of end portions 27' may be sloped upwardly from the plate 27 to the end walls 30 of casing 19 to reduce the amount of rubber required.

Bolts 26 are used to secure load plate 27 to a rectangular column 31 which is bonded to, and extends centrally through, the torsion block 21. A lower load plate 32 is bonded to the under surface of torsion block 21, and is apertured to permit insertion of a row of bolts 34 for connection to column 31 of a webbed bracket 35 extending upwardly from the walking beam 7. The under surface 36 of that portion of torsion block 21 overhanging the lower load plate 32 inclines upwardly toward the casing 19. In assembling the cushion unit in this fashion, it will be apparent that the weight of the load will be transmitted to the walking beam 7, and thence to wheels 10, from the rectangular column 31, while column 31 receives its stress through the rectangular cushioning compression block 20. As the wheels encounter obstructions in the road, the equalizer or walking beam 7 rocks about an axis 37 approximately coinciding with the center line of the upper load plate 27, while torsion block 21 deforms to cushion the movement. The action during deformation, shown in Figure 7, is such that a portion of block 21 acts in tension, while the remainder is under compression. The direction of the rocking movement is immaterial, and the effect is one of rapidly damping the movement about axis 37. Lateral thrusts are absorbed by the end portions 38 of the torsion block 21.

The walking beam 7 may be of hollow rectangular section, with the webbed bracket 35 formed centrally thereof and the hubs 9 formed at each end. The hub 9 is a cylindrical member mounted transversely of the beam 7, and may be conveniently formed integrally therewith by welding. An axle 40 is mounted rotatably within hub 9 by means of thrust bearings 41 disposed at either end thereof and held in position by suitable thrust washers 42 and lock nuts 44 threaded onto axle 40 at 45. Conventional lubricant-retaining seals 46 are inserted in the ends of hubs 9. Wheel hubs 47 are fixed on axle 40, with brake drums 49 extending inwardly therefrom, by means of locked nuts 48. Conventional disc wheels 50 carrying tires 51 are removably secured to hubs 47 by the usual means, such as bolts 52.

Within brake drums 49 is secured brake lining 53, which is engaged to produce braking action by brake shoes mounted on brake hub 54. The brake shoes and actuating mechanism therefor have been schematically illustrated at 55 attached to the brake hub 54, which is in turn secured to hub 9. The braking mechanism is protected from dirt by a flanged closure plate 56, also secured to hub 9. The details of the braking mechanism form no part of the present invention, since many satisfactory forms are known in the art.

Returning now to Figures 1 to 3 of the drawings, a webbed casting 60 is shown securing the connecting member 2 to the bolster 5 and maintaining the alignment of the latter rigidly normal to the former, and in addition providing vertical reinforcing for the bolster.

In the logging industry, for which the illustrated trailer embodiment is designed, as in any trailer service where very long loads are carried, provision must be made for curves in the roads, and the load must be allowed some freedom to turn in a horizontal plane relative to the trailer unit. Hence, the bunk 4, on which the load is carried, is joined to bolster 5 centrally by a pivotal coupling 61. A resilient block 62 is mounted in bolster 5 over each cushion unit 6, and has secured to the upper side thereof a smooth rounded end engaging plate 64 which extends parallel to walking beam 7. The bunk 4 rests on plates 64, so that the load is evenly distributed over the bolster. The sliding contact between plates 64 and bunk 4 allows the bunk to turn on pivotal coupling 61 and still be supported by each end of the bolster as well as by the central coupling.

From the above description it will be obvious to those skilled in the art that my invention is a compact, light, suspension unit which requires very little attention, but which can be removed with a minimum of time and expense. The design permits the tandem mounted paired wheels on each side of the trailer to accommodate itself to road inequalities without reference to those on the opposite side. Further, the front and rear wheel pairs of each wheel unit encounter each particular obstacle separately, and the vertical load displacement resulting is halved by the walking beam mounting. Lateral thrusts, as well as those parallel to the direction of motion, are absorbed by my suspension unit, and the rubber cushions provide a smoother haul with rapid damping effects.

In Figures 9 to 13 of the drawings, I have set forth another preferred embodiment of my invention utilizing rubber cushioning members, and pairs of wheels tandem-mounted on an equalizer beam. The trailer unit, indicated generally as 100, is joined by a connecting member 2 to the motor truck or other source of tractive power, not shown.

The structure herewith illustrated is particularly designed for handling long heavy material, and it is contemplated that the front end of the load is to be carried by the truck or equivalent supporting unit, while the rear end rests on a bunk 4 forming part of the trailer 100. This usage is typical of logging operations, but it is obvious that it is equally adapted to the handling of any long, rigid load sections.

Webbed casting 60 joins connecting member 2 to bolster 65 rigidly and at right angles thereto, and provides vertical strengthening for the bolster, while the bunk 4 is supported centrally on the bolster frame 65 by means of a pivotal joint 61, and at each end thereof by upwardly extending columns 63 having engaging plates 64 fixed thereon. Engaging plates 64 are elongated parallel to connecting member 2 and terminally rounded, and the bunk 4 rests slidably thereon. This permits the bunk 4 to rotate in a horizontal plane about the pivotal joint 61, so that the load, which is rigidly secured to the bunk, can be carried around corners and curved roads.

At either end of the bolster 65 are fixed a pair of resilient suspension members 70, aligned axially of the bolster. Between each pair of suspension members 70 is mounted a bracket arm 71 formed integrally with a walking beam 68, and reinforced by webs 72 connected thereto. Walking beam 68 extends parallel to the connecting member 2 and transversely of bolster 65, and has hubs 9 formed at each end thereof to which pairs of wheels 10 are connected by means described in detail in connection with Figure 8.

Each of the suspension members 70 comprises a cylindrical housing 73 extending downwardly from bolster 65 and secured thereto rigidly by welds 74 or equivalent means. Within housing 73 is fixed a compression block 75, cylindrical in form, bonded at its upper end to a transverse plate 76 engaging bolster 65. A central aperture 77 may be formed axially of block 75 to provide room for deformation under stress. An annular plate 79 is bonded to the lower surface of block 75 to act as an engaging surface for a rounded head 80 formed on the upper end of a load-carrying column 81 axially disposed within housing 72. Column 81 extends downwardly from the casing 73 and is rigidly secured to the walking beam or equalizer 68, passing through a bored boss 82 formed terminally of the walking beam bracket 71 and being threaded at 84 to receive a castellated lock nut 85. Lock washer 86 and cotter pin 87 may be used to prevent loosening of the connection between column 81 and the walking beam 68. All the vertical load components are carried in compression by the compression block 75, and transmitted thereby through the column 81 to the walking beam 68 and thence to the wheels 10. It will be seen by an inspection of Figure 13, which shows the action of the suspension member 70 during rocking or tilting of the walking beam 68, that the rounded head 80 of column 81 engages the annular plate 79 on compression block 75 in proper stress-transmitting position regardless of the twisting of column 81 out of the normal vertical alignment.

Within housing 73 and surrounding the column 81 is an annular torsion block 89, also formed of rubber or similar resilient material. The torsion block 89 is bonded within a cylindrical shell 90 which makes a smooth sliding fit within housing 73. A central cylindrical sleeve 91 is bonded within the block 89 and fits snugly around column 81. The rounded head 80 presses the central cylindrical shell tightly against the walking beam bracket boss 82 when lock nut 85 is tightened, so that the torsion block 89 holds the wheels and walking beam against forces tending to pull the column 81 out of the housing 73. The torsion block 89 is itself held in position within housing 73 by an annular locking cap 92 threadably joined to the lower end of the housing at 94 and engaging the cylindrical shell 90. Shell 90 is tightened by cap 92 against an annular shoulder 95 projecting inwardly from the upper portion of housing 73. Torsion block 89 absorbs and cushions the horizontal force components incident to hauling the load, and at the same time allows the walking beam to rock as the wheels 10 encounter irregularities in the road surface. The dotted wheel outlines 24 and 22 in Figure 11 illustrate the wheel positions during such rocking, and the approximate center about which the rocking occurs is shown at 96 in Figure 13. It will be observed that the use of the walking beam connection between wheels and bolster frame results in a vertical displacement of the latter, and consequently of the load, amounting to only one-half the displacement of each wheel. Hence the load is carried more smoothly by the suspension system shown than is possible in conventional wheel mountings regardless of the type of spring mounting. It will also be seen that the torsion block 89 acts as a check against recoil, so that the unit 70 combines the functions of a spring suspension, a shock absorbing, and a coil damping system. It will also be obvious that the torsion block is effective in absorbing lateral thrusts and controlling sideway.

No lubrication is required for the proper functioning of my suspension unit, and when it is desired to take it apart for inspection or replacement, it is only necessary to unscrew the cap 92. Torsion block 89 then slides out freely, and plate 76 may be turned to permit removal of the compression block 75.

Those skilled in the art will appreciate that the resilient mounting shown provides a compact, light, suspension which combines vibration damping and shock absorbing functions, with side sway control. The lubrication problem is eliminated, and maintenance reduced to a minimum.

Figures 14 to 18 of the drawings illustrate a further preferred form of resilient suspension mounting of my invention. Here the entire trailer unit, indicated generally as 101, comprises the wheels 10, the walking or equalizer beams 102 to which the tandem mounted pairs of wheels are directly connected, the bolster frame 104, and the connecting member 2 which joins the trailer unit 101 to a truck or equivalent source of motive power, not shown.

The embodiment shown was designed with particular reference to the logging industry, in which long heavy trees must be transported after felling to the sawmill. The logs are secured to the truck at the front end, and the rear ends are loaded on and fastened to the bunk 105. The wheels and the bolster frame are held in fixed relation to the connecting member 2 by a webbed reinforcing member 106. It is necessary to provide a pivotal connection between bunk 105 and the bolster frame 104, in order that curved roads and corners may be negotiated with the long loads fixed on the trailer bunk 105. Hence a pivotal center joint 107 is used, while near each end of the bolster a supporting member 109 extends upwardly therefrom and is topped by an elongated plate 64 on which the bunk 105 may rest in slidable engagement. When the bunk 105 turns on pivot 106, the load is still supported at the outer ends of the bunk by the elongated plate 64. The plate 64 is rounded off at its ends 110 to prevent catching against bunk 105 when executing very sharp turns.

A pair of spaced bolster arms 111 extend downwardly from each end of bolster 104, and are arranged to receive the cushioning units at their lower ends. Each bolster arm has a half-round lower end 112, with bosses 114 bored to receive bolts 115. Bolts 115 pass through bored bosses 116 formed on a half-round cap 117. Ribs 119 are provided to strengthen the bolster arm lower end 112, and similar ribs 120 reinforce cap 117. This structure is shown in sectional view normal to bolster 104 in Figure 17, while in Figure 18 I have shown the details of each spaced pair of bolster arms 111 in a sectional view parallel to the axis of the bolster.

The half-round lower end 112 of bolster arm 111 combines with the half-round cap 117 to form a round seat for the tubular cushion block 121, formed of rubber or similar material. From Figure 17 it will be seen that while the seat thus formed is circular in section throughout, both half-round portions taper inwardly toward the opposite arm 111, so that the seat 122 is frusto-conical. Cushion blocks 121 are formed with cylindrical bores 124 axially thereof, and are outwardly congruent with the frusto-conical seats 124, thus acting in fashion similar to tapered thrust bearings. A portion 123 may be cut off flat to provide clearance for bolts 115.

A cylindrical shaft 125 is inserted through the cylindrical bores 124 of the cushion blocks 121, and secured in place by lock nuts 126 engaging threaded shaft ends 127. The lock nuts 126 place blocks 121 under any desired compression through washers 129 disposed therebetween. Shaft 125 also passes centrally through the walking beam hub 130, fixed thereto between the paired bolster arms 111 and engaged laterally by cushion blocks 121. The walking beam 102 and hub 130 may be joined by any convenient means, such as welds 131.

The walking beam hub 130 and the beam 102 formed integrally therewith carry wheel pairs 10 fixed to each end of the beam 102 through hubs 9. The details of this hub structure were described in connection with Figure 8 and will not be repeated here.

It will be seen that the cushion members 121 are adapted to absorb lateral thrusts, and both horizontal and vertical components of load stress. It is intended that the cushion members are to be bonded to the cylindrical shaft 125, so that the rocking movement of the walking beam 102 may be controlled thereby. In Figure 16 I have shown in dotted outlines 22 and 24 the positions assumed by the wheels 10 at substantially the limits of their torsional movement about shaft 125. It has been observed that the rubber members 121 cushion the initial shock of rocking motion of beam 102, and dampen the oscillations thereof rapidly. The use of the walking beam wheel suspension permits each pair of wheels 10 to encounter road irregularities with a resultant vertical load displacement substantially half that which would be experienced with the usual wheel mounting. This is of great advantage in making possible higher speeds in hauling and in reducing the strains on the entire supporting structure.

The embodiment illustrated in Figures 14 to 18 is compact, light in weight, and free from lubrication and maintenance troubles. If it is necessary to remove the wheel assemblies from the trailer, it is only necessary to loosen bolts 115, and similarly in case it is desired to replace the cushion blocks 121.

From the above description it will be apparent to those skilled in the art that I have set forth a resilient wheel suspension system for multi-wheeled vehicles which can be made very light and compact. The design permits ready access to all parts for inspection or replacement, and reduces maintenance and lubrication to a minimum. The resilient units incorporated in my structure not only cushion the vertical and horizontal shocks due to carrying the load, but also control lateral thrust and side sway and act as vibration dampeners. A substantial reduction in load displacement due to inequalities in road surface is obtained, and faster, smoother hauling, with resultant economy of operation. A reduction in the first cost of the spring units is obtained, while the more favorable ratio of sprung to unsprung weight results in less damage to highways in hauling heavy loads at high speeds.

Modifications in the details of my structure may occur to those familiar with the art, and it will be obvious that the principles of my invention may be applied to services other than that for which these embodiments were particularly designed without departing from the spirit of the invention as set forth in the appended claims.

I claim:

1. In a vehicle, a frame, a plurality of wheels tandem-mounted on walking beams, and a resilient suspension unit joining each of said beams to said frame comprising a housing, a resilient load-supporting member disposed therein, and a second resilient member disposed therein arranged to absorb horizontal thrusts and to cushion torsional movements of said beam relative to said frame.

2. In a vehicle having a frame and a plurality of wheels arranged in tandem on equalizer beams, resilient suspension units connecting each of said beams to said frame, comprising a housing, a resilient load-carrying member positioned therein, and a resilient thrust member positioned therein and arranged to permit both longitudinal and transverse rocking of said beam relative to said frame.

3. The combination, with a multi-wheeled vehicle having a frame and walking beams connecting said wheels in tandem, of means for resiliently supporting said frame on said walking beams, comprising a bolster fixed transversely to said frame, a seat formed on each end of said bolster, a resilient supporting unit removably fixed within said seat and connected to said beam and including a load-carrying rubber block and a thrust and torsion rubber block.

4. In a vehicle, a frame, walking beams, a plurality of wheels tandem-mounted on said beams, and means for joining said beams resiliently to said frame, comprising a bolster fixed transversely to said frame, a pair of spaced cylindrical housing members extending downwardly near each end of said bolster, a compression block disposed within each of said housing members and bearing against said bolster, a rigid column positioned axially of said housing and bearing upwardly against said block, an annular torsion block disposed about said column and bonded to said column and within said housing, and bracket arms disposed parallel to said bolster joining said columns of each pair of said housing members transversely and secured centrally to one of said walking beams.

5. In a multi-wheeled vehicle, a frame, walking beams securing pairs of said wheels in tandem, and means for supporting said frame resiliently on said walking beams, comprising a bolster fixed transversely to said frame, cylindrical housing members extending downwardly in pairs from each end of said bolster, a backing plate disposed within each of said housing members in contact with said bolster, cylindrical rubber compression blocks disposed axially of said housing against each of said backing plates, an annular lower backing plate secured beneath each of said blocks, an annular rubber torsion block bonded within each of said housing members, a load-carrying column extending axially through each of said torsion blocks and bonded thereto, a rounded head formed on each of said columns and engaging said lower backing plate, and bracket arms fixed centrally to and extending transversely from each of said walking beams and secured to said columns from each pair of said housing members.

6. In a multi-wheeled vehicle having a frame and walking beams joining pairs of said wheels in tandem, resilient means for supporting said frame on said beams, comprising bracket arms extending transversely centrally of said beams, supporting columns extending vertically from said bracket arms on each side of said beams, rounded heads formed on each of said columns, an annular bearing plate engaging each of said heads, a cylindrical rubber load-carrying block secured above each of said bearing plates, a second annular bearing plate bonded over each of said blocks; a bolster extending transversely of said frame and resting on said second bearing plates, paired cylindrical housing members extending downwardly from said bolster snugly about each of said second bearing plates and axially about said columns, and annular rubber torsion and thrust blocks bonded within said housing members about said columns and secured within said housings.

7. In a multi-wheeled vehicle having equalizer beams joining wheel pairs in tandem and a frame, means for resiliently mounting said frame on said equalizer beams, comprising transverse bracket arms projecting from said beams, supporting columns extending upwardly from said brackets on opposite sides of each of said beams, a rounded head formed on each of said columns, an annular bearing plate resting slidably on said head, an annular rubber load block bonded on said annular bearing plate, an annular spacing and upper bearing plate bonded on said load block; a bolster extending fixedly transversely of said frame and resting on said upper bearing plate associated with each of said columns, a cylindrical housing extending downwardly from said bolster about each of said bearing plates and columns, and an annular thrust and torsion block secured within each of said housing members and bonded to said column.

8. In a vehicle having a frame, equalizer beams, and a plurality of wheels tandem-mounted on said equalizer beams rockably relative to said frame, a bolster fixed transversely of said frame, paired bolster arms extending downwardly from said bolster at each side of said frame, rubber cushioning members disposed in said bolster arms, and shafts extending from said equalizer beams into supporting engagement with said rubber members.

THEODORE A. PETERMAN.